(12) United States Patent
Ewart et al.

(10) Patent No.: US 6,934,939 B2
(45) Date of Patent: Aug. 23, 2005

(54) METHOD FOR UNWINDING A PROGRAM CALL STACK

(75) Inventors: Graham W. Ewart, Don Mills (CA); Hans E. Boettiger, Tuebingen (DE); Patricia A. Healy, Saugerties, NY (US); James T. Mulvey, Red Hook, NY (US); Gregory T. Reid, Miami Beach, FL (US); David J. Sudlik, West Sbolean, NY (US)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 09/795,165

(22) Filed: Feb. 28, 2001

(65) Prior Publication Data

US 2002/0188931 A1 Dec. 12, 2002

(51) Int. Cl.[7] .................................................. G06F 9/45
(52) U.S. Cl. ........................................ 717/152; 712/227
(58) Field of Search .................................. 717/152, 154; 712/227

(56) References Cited

U.S. PATENT DOCUMENTS

| | | | | |
|---|---|---|---|---|
| 4,488,227 A | * | 12/1984 | Miu et al. | 712/244 |
| 5,628,016 A | * | 5/1997 | Kukol | 717/140 |
| 5,724,564 A | | 3/1998 | Conder et al. | 305/591 |
| 6,289,446 B1 | * | 9/2001 | Nilsson | 712/244 |
| 6,293,712 B1 | * | 9/2001 | Coutant | 717/155 |

FOREIGN PATENT DOCUMENTS

| | | |
|---|---|---|
| CA | 2097542 | 9/1998 |
| JP | 401259435 A | * 10/1989 |

OTHER PUBLICATIONS

Microsoft Computer Dictionary Fifth Edition, 2002, p. 368.*
Henderson, Fergus, "The Mercury Project diff: fix some mdb bugs", 1998, retrieved from google.com Feb. 11, 2003.*
Keating, Geoff, "End markers for functions", 1999, retrieved from google.com Feb. 11, 2004.*
Owens, Keith, "CONFIG_NO_FRAME_POINTER", Apr. 2002, retrieved from google.com Feb. 11, 2004.*
Rosenberg, Jonathan B., "How Debuggers Work", p. 137, 3rd paragraph, 1996 by John Wiley & Sons, Inc.*
Hewett–Packard, Nov., 1986, "Software Patent Institute Database of Software Rechnologies", Record Display, Record 1, Serial No. hp600156.0055.
KV Nallapati and SB Peckham, "Technique for Calling 64-bit Functions from 32-bit Functions".

* cited by examiner

*Primary Examiner*—Wei Y. Zhen
*Assistant Examiner*—Mary Steelman
(74) *Attorney, Agent, or Firm*—William A. Kinnaman, Jr.; Cantor Colburn LLP

(57) ABSTRACT

A method is disclosed for instructing a computing system to unwind a program call stack that lacks explicit Stack Frame Backchain Pointers, including finding the called function's entry point, determining the return point in the calling function, placing a NOP instruction at the return point that contains embedded information about what type of call was used, and backing up in storage by an amount determined by using the address of the called function's entry point to locate the static data item containing the called function's DSA size.

14 Claims, 8 Drawing Sheets

```
1   @1L0  DS   0D              XPLink entrypoint marker
2         =X'00C300C5'         ".C.E"
3         =X'00C500F1'         ".E.1"
4         =F'-32'     Offset to Program Prolog Area
5         =F'128'     Size of DSA
6   main  DS   0D
7         STM  R5,R8,1924(R4)
8         AHI  R4,H'-128'
9         BASR R8,0
```

Prolog Code for Function without DSA Backchain

Sample Stack Segment after main() calls functions foo()

FIG. 1
PRIOR ART

```
1    ENTRYPT B   *+20            SKIP OVER CONSTANT AREA TO LINE 6
2         DC  AL4(X'00C3C5C5')  EYECATCHER'.CEE'
3         DC  AL4(DSA_size)     SIZE OF DSA
4         DC  AL4(CEEPPA1-ENTRYPT) OFFSET TO PPA1
5         B   1(,R15)           WRONG ENTRY POINT, CAUSE EXCEPTION
6         STM R14,R12,12(R13)   SAVE CALLER'S REGISTERS
7         L   Ra,CEEDSANAB-CEEDSA(,R13) LOAD NEW DSA ADDRESS
8         L   R0,length         LOAD DSA LENGTH
9         AIR R0,Ra             GENERATE NEW NAB ADDRESS
10        CL  R0,CEECAAEOS-CEECAA(R,12)EXCEED CURRENT STORAGE
11   SEGMENT?
12        BNH CL..1             NO- WE GOT IT
13        L   R15,CEECAAGETS-CEECAA(,R12) ADDRESS OF STACK
14   SEGMENT MGR
15        *-- Input to stack overflow routine
16        *-- 1) R0 calculated required next available byte
17        *-- 2) R12 address of CEECAA
18        *-- 3) R13 caller's save area address
19        *-- 4) R14 return address
20        *-- 5) R15 stack overflow routine entry point address
21        BALR R14,R15           GET ANOTHER STACK SEGMENT
22        *-- Upon return from the stack segment manager:
23        *-- 1) R15 has the new DSA address
24        *-- 2) R0 has the new NAB address
25        LR  Ra,R15    PUT DSA ADDRESS INTO WORK REGISTER CL..1
26        ST  R13,4(,Ra)        BACK CHAIN NEW DSA TO CALLER
27        ST  R0,CEEDSANAB-CEEDSA(,Ra) STORE NEW NAB ADDRESS
28        LR  R13,Ra            SET DSA POINTER REGISTER
```

Prolog Code for Function with DSA Backchain

FIG. 2
PRIOR ART

```
L    R13,4(,R13)        LOAD CALLER'S DSA ADDRESS
LM   R14,R12,12(R13)    LOAD CALLER'S REGISTERS
BR   R14                RETURN TO CALLER
```

Epilog Code for Function with DSA Backchain

FIG. 3
PRIOR ART

```
1   @1L0  DS   0D              XPLink entrypoint marker
2         =X'00C300C5'         ".C.E"
3         =X'00C500F1'         ".E.1"
4         =F'-32'      Offset to Program Prolog Area
5         =F'128'      Size of DSA
6   main  DS   0D
7         STM  R5,R8,1924(R4)
8         AHI  R4,H'-128'
9         BASR R8,0
```

Prolog Code for Function without DSA Backchain

Epilog Code for Function without DSA Backchain

FIG. 5

```
1       *-- The following instructions load R6 with the address of the
2       *-- function being called and then branches to it. The called
3       *-- function entry point address is in R6
4       LM   R5,R6,=V(fn)
5       BASR R7,R6
6          *-- The Hex machine representation of the following nop is:
7          *--   4700 FFFA
8       NOP  4090(,R15)
```

Call Site 1 for Function without DSA Backchain

FIG. 6

| | |
|---|---|
| 1 | *-- The following instruction is a "relative branch" to 37 |
| 2 | *-- halfwords from the current location. |
| 3 | BRAS R7,H'37' |
| 4 | *-- The hex machine representation of the following nop is: |
| 5 | *-- 4701 FFFC |
| 6 | NOP 4092(R1,R15) |

Call Site 2 for Function without DSA Backchain

FIG. 7

| | | | |
|---|---|---|---|
| 1 | | CALL | |
| 2 | >= =>Return point> | NOP 0, (call type) | Encoded infromation indicating |
| 3 | | | the type of call. |
| 4 | | ORG *-2 | Backup to last two bytes of NOP. |
| 5 | | | |
| 6 | | DC AL2(call offset) | Signed Offset in doublewords |
| 7 | | | from the doubleword at or 8 |
| 9 | | | positive, offset to 'Call |
| 10 | | | Descriptor'. If negative, offset to |
| 11 | | | 'Entry Point Marker'. |

Use of Call Type Descriptor

FIG. 8

METHOD FOR UNWINDING A PROGRAM CALL STACK

BACKGROUND

When a function is initially called, the first thing it typically does in its prolog code is to save the contents of the hardware registers. The register contents at function call time represent the state of the calling function, and this state must be restored when the called function returns. Since the called function will most likely need to use the hardware registers for its own purposes, the contents of any registers (general purpose, floating point, etc.) that may be changed must first be saved in what is referred to as a register save area.

A called function may also need some working storage where it can place its automatic data, which is data with a scope limited to the duration of the called function. When the called function returns, its automatic data is no longer required.

Both of these storage requirements can be satisfied through the use of a dynamic storage area or Stack. The Stack can be comprised of several Stack Segments that are considered contiguous in storage from the application's perspective, although they may reside in real memory at discontinuous storage locations. The Stack consists of storage that is specific to a single thread of program execution. Typically, every function that has been called but not yet returned during the current program's execution is represented in the Stack by a Stack Frame.

Typically, the prolog code for a function that has just been called will save the calling function's registers and/or allocate storage for its Stack Frame before it does anything else. For example, function prolog code may save the calling function's registers into a register save area in a Stack Frame that was allocated by the calling function and is pointed to by a register. The Stack Frame size of the called function, which is known at compile time, is used to determine if the called function's Stack Frame will fit within the current Stack Segment. If it does not, a new Stack Segment is allocated. The code also saves the address of the calling function's Stack Frame into the new Stack Frame allocated by the called function. This saved address, known as a Stack Frame Backchain Pointer, can be used to find the calling function's Stack Frame. The process of traversing backwards through the Stack towards older calling functions is known as Stack Unwinding. The called function's epilog code restores the register containing the calling function's Stack Frame address, using the Stack Frame Backchain Pointer, before it returns control to the calling function.

Unfortunately, saving and restoring the Stack Frame Backchain Pointer in a called function's Stack Frame adds instruction cycles to the prolog and epilog code sections of every function that is called during the execution of the application. For programming languages built around an object-oriented paradigm (e.g., C++ and Java), there may be many function calls, some to functions having an actual "function body" (the executable instructions between the function prolog and epilog) that is small relative to the sizes of the prolog and epilog sections. In these cases, there can be a significant performance benefit by eliminating unnecessary instruction cycles ("call linkage overhead") from the prolog and epilog code sections. Accordingly, for such function calls it is desirable to provide a method to unwind Stack Frames without the need for a Stack Frame Backchain Pointer in each Stack Frame.

SUMMARY

This disclosure presents a method for instructing a computing system to unwind a program call stack that lacks explicit Stack Frame Backchain Pointers, including finding the called function's entry point, determining the return point in the calling function, placing a No Operation ("NOP") instruction at the return point that contains embedded information about what type of call was used, and backing up in storage by an amount determined by using the address of the called function's entry point to locate the static data item containing the called function's DSA size.

BRIEF DESCRIPTION OF THE DRAWINGS

The present disclosure will be better understood, and its numerous features and advantages will become apparent to those skilled in the pertinent art by referencing the accompanying drawings, in which.

DETAILED DESCRIPTION

An exemplary method is provided for unwinding a program call stack where the function stack frames do not include backchain pointers. The method unwinds one or more stack frames without requiring any backchain pointers in the stack frame memory.

When a function is initially called, the first thing it normally does is to save the contents of the hardware registers. The register contents at the time the function is called represent the state of the calling function, and this state is to be restored before the called function returns. Since the called function will most likely need to use the hardware registers for its own purposes, the contents of any registers (e.g., general purpose, floating point, etc.) that must be changed must first be saved, typically in a register save area.

A called function may also require some working storage where it can place its automatic data, which is data with a scope limited to the duration of the called function. When the called function returns, its automatic data is no longer required, so its storage space may be reused. Both of these storage requirements can be satisfied through the use of a Stack Frame (also called a Dynamic Storage Area, or "DSA").

Figure 1:
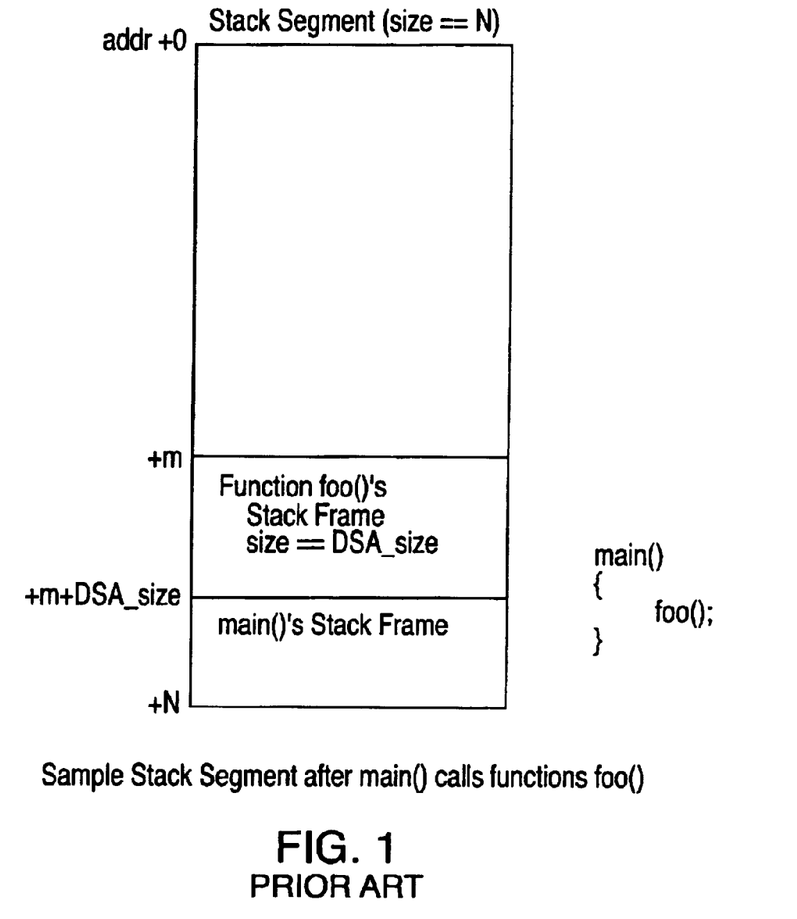
FIG. 1 is a schematic diagram of a typical program call stack.

Turning to FIG. 1, a program call stack may include several Stack Segments of predefined size (e.g., N words) that are considered contiguous in storage from the application's perspective, although they may reside in real memory at discontinuous storage locations. The Stack consists of storage that is specific to a single thread of program execution. Typically, a separate Stack Frame corresponds to each function that has been called during execution of the current program, but which has not yet returned. However, it is possible that the most recently called function, if it is a "leaf" routine that makes no further calls, will not have a Stack Frame on the Stack.

Figure 2:
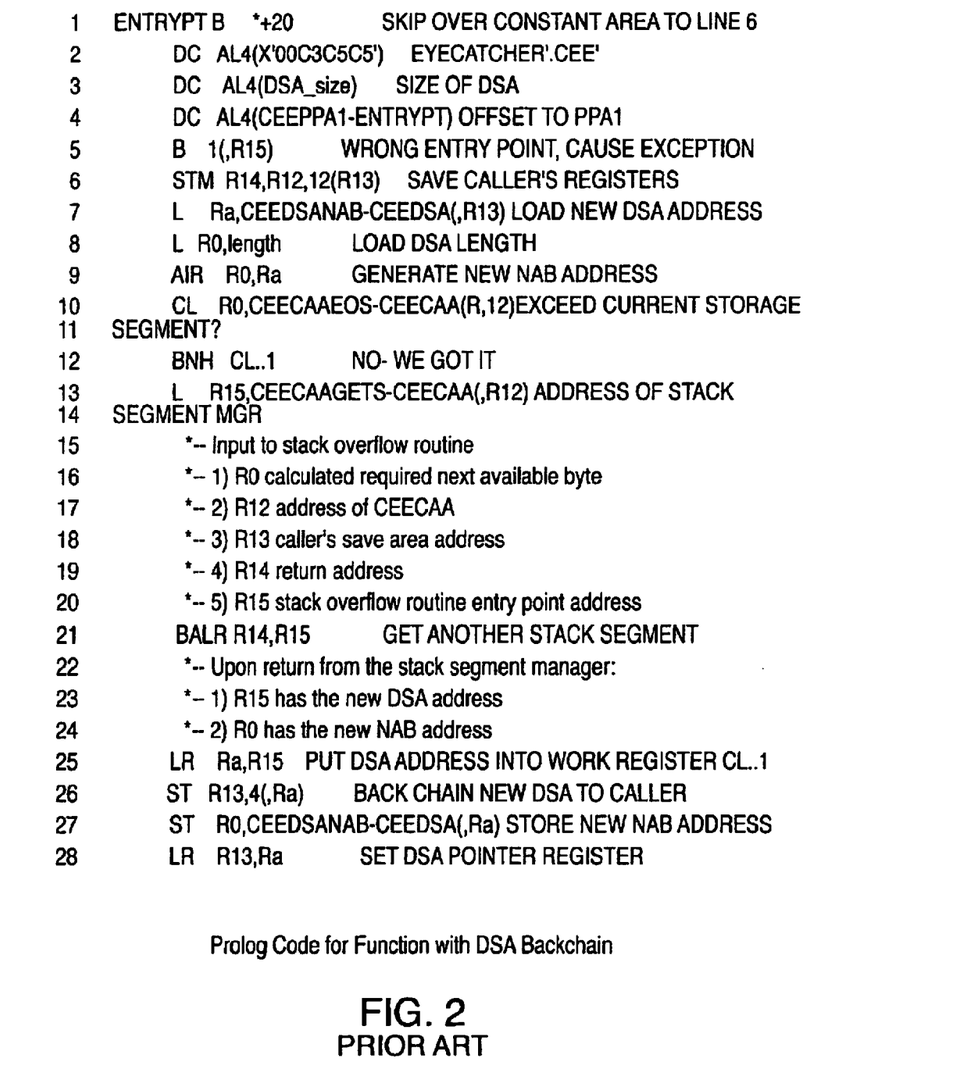
FIG. 2 is a sample pseudocode listing of prior art function prolog code.

Typically, the prolog code for a function that has just been called will save the calling function's registers and/or allocate storage for its Stack Frame before it does anything else. For example, FIG. 2 shows some function prolog code typical for a C function that has been compiled on IBM's OS/390 operating system using a previous method. Line 6 saves the calling function's registers into a register save area in a Stack Frame that was allocated by the calling function and is pointed to by register 13. Lines 7 through 17 use the Stack Frame size of the called function, which is known at compile time, to determine if the called function's Stack Frame will fit within the current Stack Segment. If it will not fit, a new Stack Segment is allocated. Line 15 saves the address of the calling function's Stack Frame, which was in register 13 when the called function got control, into the new Stack Frame allocated by the called function. This provides what is known as a Stack Frame Backchain Pointer that can be used to find the calling function's Stack Frame. This processing of traversing backwards (i.e., towards older calling functions) through the Stack is also known as Stack Unwinding.

Figure 3:
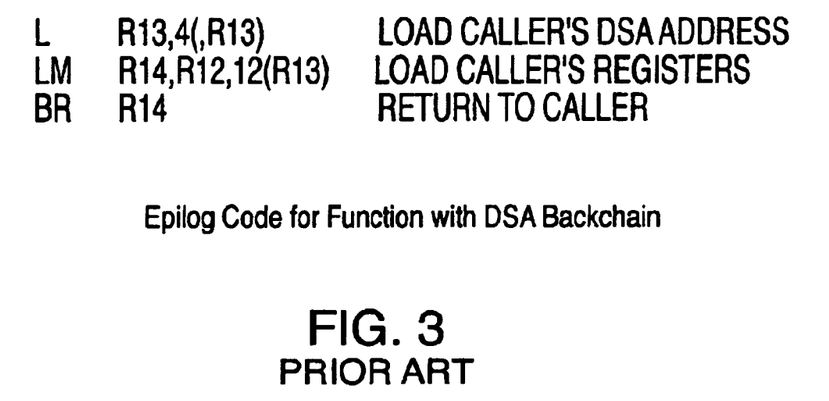
FIG. 3 is a sample pseudocode listing of prior art function epilog code.

FIG. 3 shows how the called function's epilog code that corresponds to the prolog code of FIG. 2 restores register 13, which contains the calling function's Stack Frame address, at line 1 using the Stack Frame Backchain Pointer before it returns control back to the calling function.

Unfortunately, saving and restoring the Stack Frame Backchain Pointer in a called function's Stack Frame adds instruction cycles to every prolog and epilog of every function that is called during the execution of the application. For programming languages built around an object-oriented paradigm (e.g., C++ and Java), there may be many function calls, some to functions whose actual "function body" (the executable instructions between the function prolog and epilog) is small relative to the those in the prolog and epilog. In this case, there can be a significant performance benefit by eliminating as many unnecessary instruction cycles as possible from the prolog and epilog (known as call linkage overhead). With this embodiment, a method is provided to unwind Stack Frames without the need for a Stack Frame Backchain Pointer in each Stack Frame.

Figure 4:
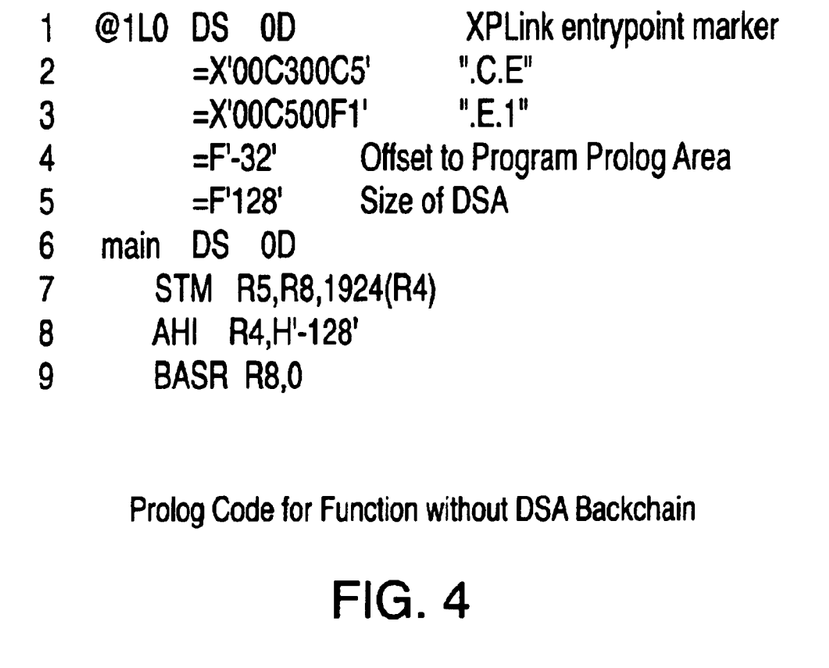
FIG. 4 is a sample pseudocode listing of new function prolog code.
Figure 5:
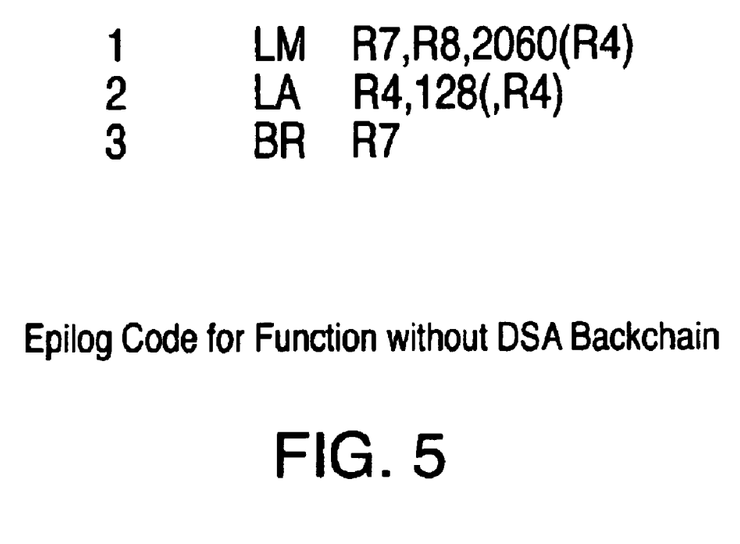
FIG. 5 is a sample pseudocode listing of new function epilog code.

FIGS. 4 and 5 illustrate function prolog and epilog code, respectively, that could be generated from a C or C++ function compiled with the new XPLINK compiler option on IBM's OS/390 operating system. The new XPLINK linkage takes advantage of a downward growing stack frame (e.g., the Stack Segment shown in FIG. 1 is downward growing) and a write-protected guard page to eliminate the instructions of FIGS. 2 and 3 that were necessary to check for Stack Segment overflow. Also eliminated from this function prolog code are the instructions that would save a Stack Frame Backchain Pointer in each Stack Frame. This elimination further reduces the number of hardware cycles required in each function prolog, but it requires a new technique, such as described in this exemplary embodiment, to unwind the Stack in those situations where unwinding of the stack becomes necessary.

Since the stack is downward growing, the new Stack Frames are allocated by subtracting the DSA size (i.e., the size of the new Stack Frame) from the value of the current Stack Pointer. Conversely, the calling function's Stack Frame can be found by adding the DSA size of the called function to the value of the Stack Pointer. While the DSA size of the called function is known by the compiler and can be used in the function epilog code, it is also possible to locate each Stack Frame during Stack unwinding. The process of unwinding a Stack is normally done by an external function that has no direct knowledge of any called function's Stack Frame.

The technique described here for Stack unwinding without a backchain pointer could also work for upward growing Stack Frames. In this case Stack Frames are allocated by adding the DSA size, and Stack unwinding occurs by subtracting the DSA size. Upward growing stack frames are currently less efficient though, as a write-protected guard page is not used to implicitly check for stack overflow.

To illustrate this method on a downward growing Stack, assume that a program exception has interrupted the execution of a function, and an exception handler routine has requested that the operating system resume execution at a point earlier in the Stack (e.g., by issuing a UNIX longjmp( ) service). This will require that the operating system be able to unwind the chain of Stack Frames. It then becomes necessary to be able to find the DSA size of each unreturned function. Since each size is known at compilation time, it can be included as static data in the executable function. One place to put this is in a function prolog area that just precedes the function's main entry point. Assuming this exemplary location, then one method to Stack unwinding without an explicit Stack Frame Backchain Pointers is described below.

1. Start by finding the called function's entry point. Although it can not be assumed that the called function's entry point is in the register save area because the function may have been called using a relative branching technique, the address of the return point in the calling function is known.

2. Next, determine the return point in the calling function. The return point in the calling function is right after the instruction that was used to make the function call. Normally this can be found in the called function's register save area. Although the present example assumes that the interrupted function has completed its prolog code, if the interrupt occurred in the prolog of the called function before the registers were saved then the return address is still contained in a register.

Figure 6:
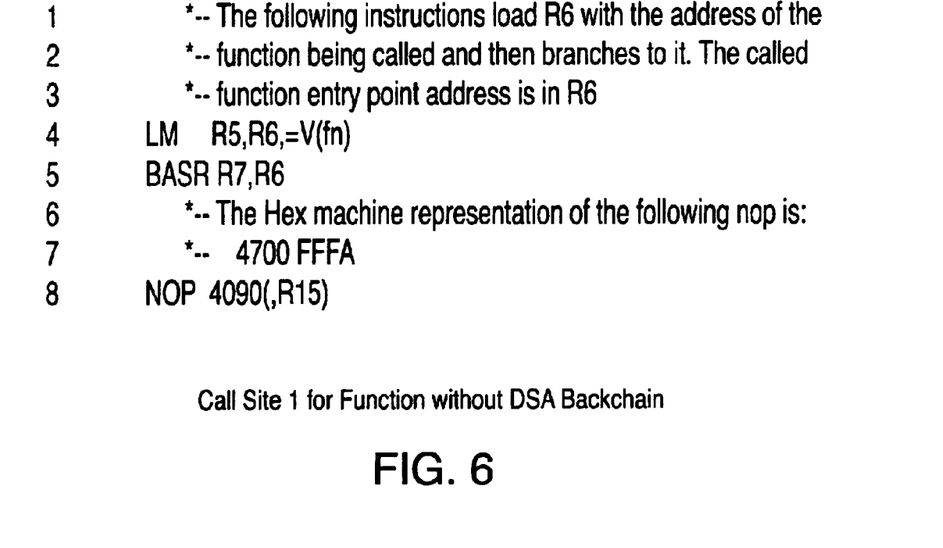
FIG. 6 is a sample pseudocode listing for a call using a branch instruction based on the contents of a hardware register.
Figure 7:
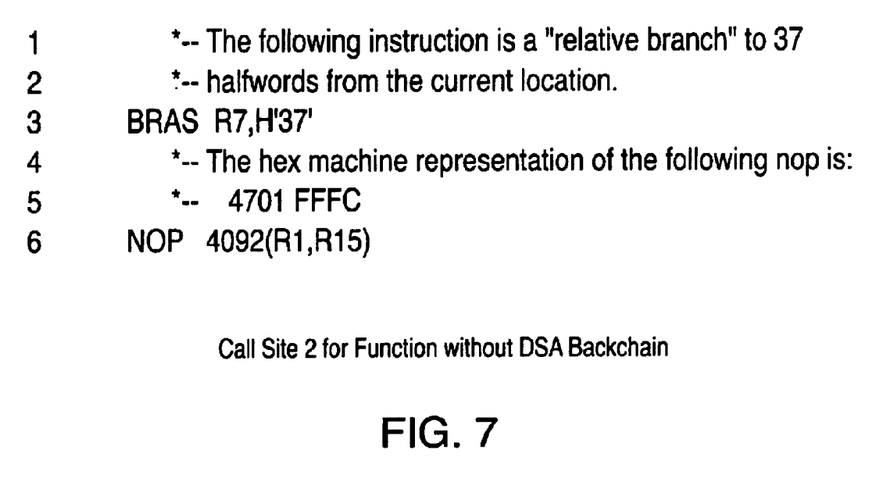
FIG. 7 is a sample pseudocode listing for a call using a relative branch instruction.

3. The compiler can place a NOP instruction at the return point that contains embedded information about what type of call was used. If the embedded NOP information indicates the call was made using an instruction that branched to the called function's entry point based on the contents of a hardware register, then the called function's entry point can be obtained from the called function's register save area. The code sample of FIG. 6 shows an example of this type of call site. If the embedded NOP information indicates the call was made using a relative branch instruction, then the called function's entry point can be calculated from the address of the call site and the size of the relative branch, positive or negative (this size can be obtained by decoding the instruction used to branch to the called function's entry point). The code sample of FIG. 7 shows an example of this type of call site.

4. Next, using the address of the called function's entry point, we can back up in storage by a known fixed amount to locate the static data item containing the called function's DSA size.

5. For a downward growing Stack, add the DSA size of the called function to the called function's Stack pointer to obtain the address of the calling function's Stack Frame.

6. Repeat steps 2 through 5 as necessary.

This method exemplifies how a Stack can be unwound without the use of a Stack Frame Backchain Pointer. Since Stack unwinding is an operation that is typically performed only in cases of exception, the tradeoff between eliminating cycles in heavily executed prolog and epilog code paths as in the exemplary embodiment versus the potentially unrealized cost of unwinding the entire chain of Stack Frames is a worthwhile one for many function-call intensive programs.

In operation, the exemplary method allows compilers and others to create prolog code that does not need to set a backchain pointer while providing a means for the runtime environment to continue to be able to unwind the stack, which is necessary for exception and jump processing. Stack unwinding without a backchain pointer uses a stack structure that grows from higher to lower addresses as save areas are pushed on. On function entry, a save area is acquired by simply subtracting the function's save area size from the current stack pointer. Subsequently, on function exit, a save area is deleted by adding the function's save area size to the current stack pointer. This pops the save area off the stack which then points back on the caller's save area.

There are several new structures created to support unwinding the stack from the perspective of the runtime environment in order to support exception and jump processing. They are the Call Type Descriptor, Call Descriptor, and Entry Point Marker.

A Call Type Descriptor consists of a NOP located at the return point of a call site that is encoded to provide information for the runtime to use to locate the entry point of the function. Once the entry point of the function is located, the save area size for the function can be identified and arithmetic used to locate the save area of the function's caller.

A Call Type Descriptor is a NOP instruction immediately following a function call with 4 bits reserved to indicate the 'type' of call and 28 bits to contain an offset to either a 'Call Descriptor', which contains parameter mapping information about the call and an offset to the 'Entry Point Marker', or if the offset is negative, the offset is to the 'Entry Point Marker' for the function making the call.

Figure 8:
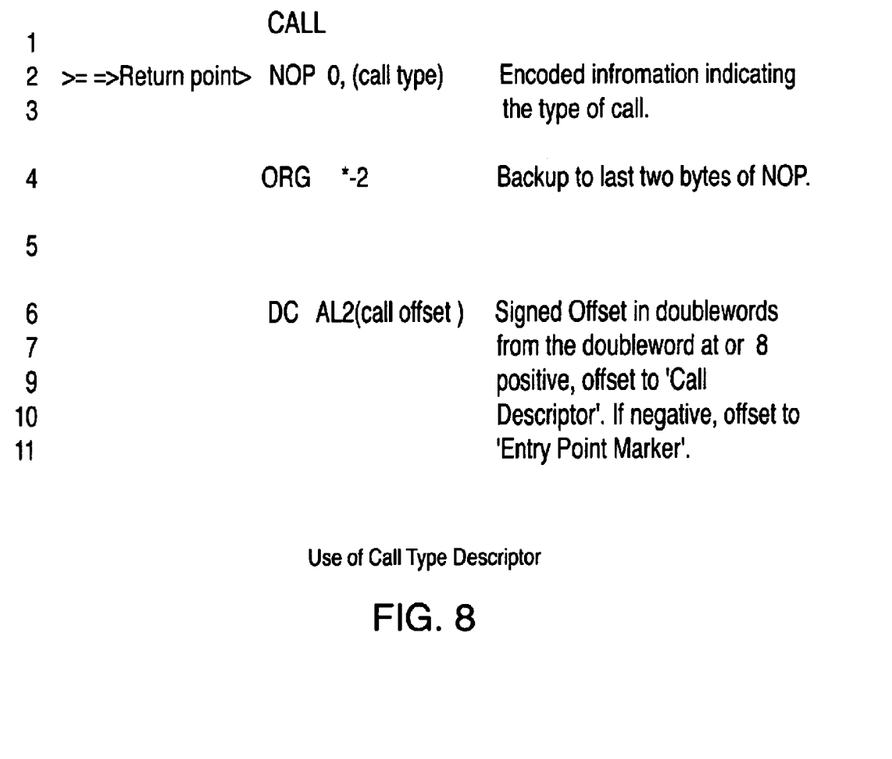
FIG. 8 is a sample pseudocode listing for the use of a call type descriptor.

An exemplary call type descriptor would be used in the code of a calling program as shown in FIG. 8. The 4 bits of "call type" information are currently defined in this exemplary embodiment as:

0000=Call using standard branch and save or BASR
0001=Call using branch relative or BRAS The 'Entry Point Marker' starts 16 bytes behind a function entry point. This consists of an eyecatcher that is designed to never be confused as code and some encoded information, including the size of the function's save area. It is arranged as follows:

| Entry Point Marker: | |
| --- | --- |
| +0 | 7 byte unique eyecatcher |
| +7 | One byte marker identifier |
| +8 | Offset to Program Prolog Area |
| +12 | Save area size |

Using a save area, the entry point marker of the callee, or the routine that owns a specific save area, can be found by either walking the code from a known point of interruption back to the entry point marker's eyecatcher, or using the return register in the save area to locate the call type descriptor to determine whether the call was done using a branch and save or branch relative. If the call was via branch and save ("BASR") the entry point of the callee is available in a copy of the entry register in the callee's save area. If the call was done via branch relative ("BRAS"), the entry point of the callee can be computed as an offset from the call point. Once the entry point marker is located, the save area size of the callee can be retrieved and used arithmetically (added to the current save area) to locate the caller's save area.

In a stack walking scenario, once the size of the save area for the routine at the top of the call chain has been established, the remainder of the call chain can be traversed using either the same technique for finding the entry point markers or the slightly more efficient method, which uses the call offset information stored in the call type descriptor.

An advantage of the described exemplary embodiment is that a program compiled using the method of the XPLINK compiler option may execute more quickly at run-time, particularly if the program will encounter multiple function calls during execution.

While exemplary embodiments have been shown and described, various modifications and substitutions may be made thereto without departing from the spirit and scope of the disclosure. Accordingly, it is to be understood that the present disclosure has been made by way of illustration only, and such illustrations and embodiments as have been disclosed herein are not to be construed as limiting to the claims.

What is claimed is:

1. A method for unwinding a program call stack comprising:
    determining a return point in a calling function;
    locating a call type descriptor instruction at the return point, the call type descriptor instruction including a no operation (NOP) instruction that is encoded to include a type of call;
    determining the called function's entry point from a register save area of the called function, if the type of call indicates a call was made using an instruction that branched to the called function's entry point based on a register;
    determining the called function's entry point from an address of a call site and a size of the relative branch, if the type of call indicates the call was made using a relative branch instruction; and
    backing up in storage by an amount determined by using the address of called function's entry point to locate a static data item containing the called function's dynamic storage area (DSA) size.

2. A method as defined in claim 1 wherein the program call stack is a downward growing Stack.

3. A method as defined in claim 2, further comprising: adding the DSA size of the called function to the called function's Stack pain to obtain the address of the calling function's Stack Frame.

4. A method as defined in claim 1 wherein finding the called function's entry point does not assume that the called function's entry point is in the register save area because the function may have been called using a relative branching technique, but the address of the return point in the calling function is known.

5. A method as defined in claim 1 wherein determining the re point in the calling function comprises at least one of accessing the called function's register save area and accessing a register.

6. A method as defined in claim 1 wherein accessing the size of the relative branch comprises decoding the instruction used to branch to the called function's entry point and calculating the offset to the called function's entry point from the address of the call site.

7. The method of claim 1, wherein the call type descriptor instruction includes an offset and, when the offset is positive, the offset is to a call descriptor having parameter mapping information about the call and an offset to the calling function's entry point marker and, when the offset is negative, the offset is to the calling function's entry point marker.

8. The method of claim 7, wherein the entry point marker include a marker identifier, an offset to a program prolog area, and a save area size, the save area size being used to locate the calling function's save area.

9. The method of claim 8, wherein the save area size is determined by walking the code from a known point of interruption back to the marker identifier.

10. The method of claim 8, wherein the save area size is determined using a return register in the save area to locate the call type descriptor instruction to determine whether the call was done using a branch and save or branch relative.

11. The method of claim 10, wherein the call was done using the branch and save and the called function's entry point is determined from a copy of the save are.

12. The method of claim 10, wherein the call was done using branch relative and the called function's entry point is computed as an offset from the calling function's entry point.

13. The method of claim 12, wherein the size of the relative branch is positive or negative and the size is determined by decoding an instruction used to branch to the called function's entry point.

14. The method of claim 1, further comprising placing the call type descriptor instruction a the return point at compile time.

* * * * *